May 26, 1970  MASANAO MATSUI ET AL  3,514,452
NOVEL DERIVATIVES OF MITOMYCIN A, MITOMYCIN B, AND MITOMYCIN C
Filed June 3, 1964  16 Sheets-Sheet 1
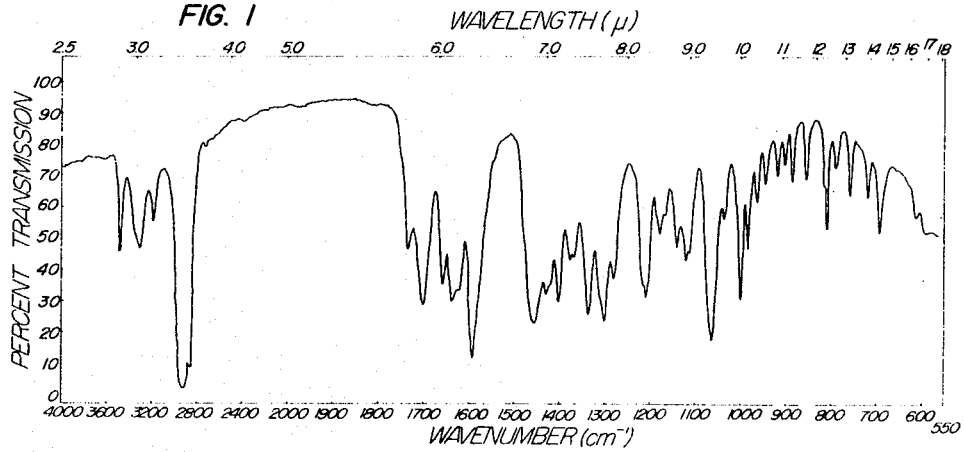
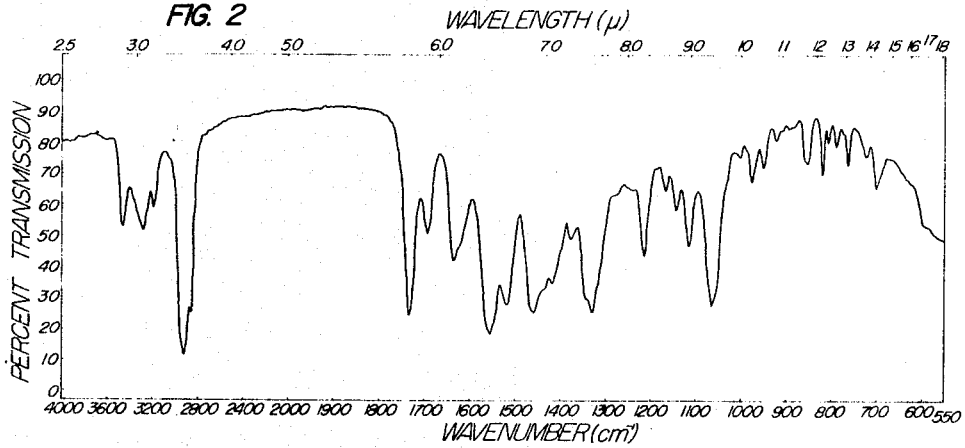
Masanao Matsui,
Yasuhiro Yamada,
Shigetoshi Wakaki and
Keizo Uzu INVENTORS
BY Wenderoth, Lind and
Ponack, ATTORNEYS

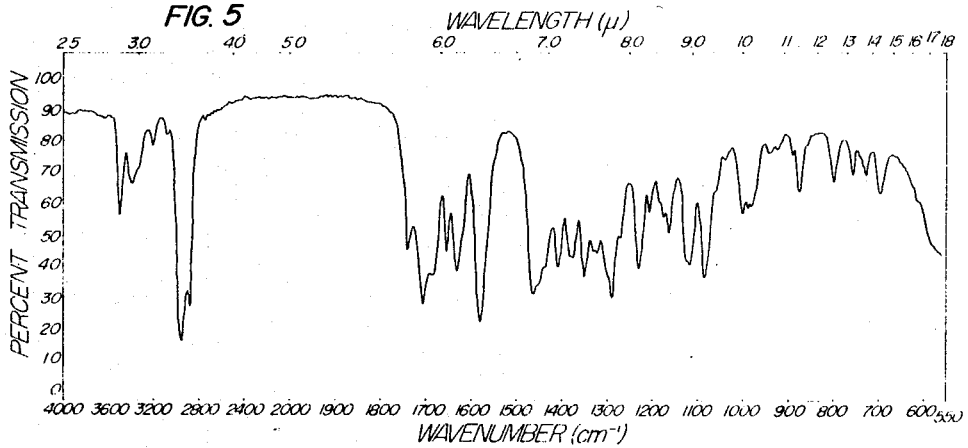
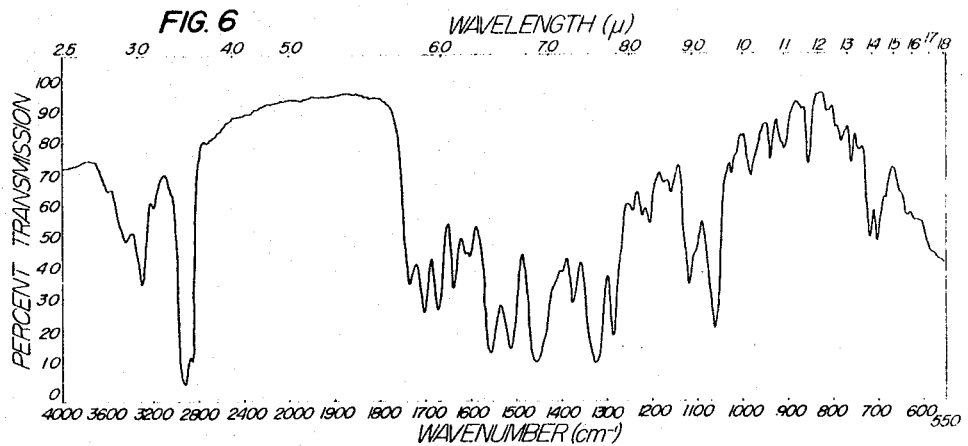

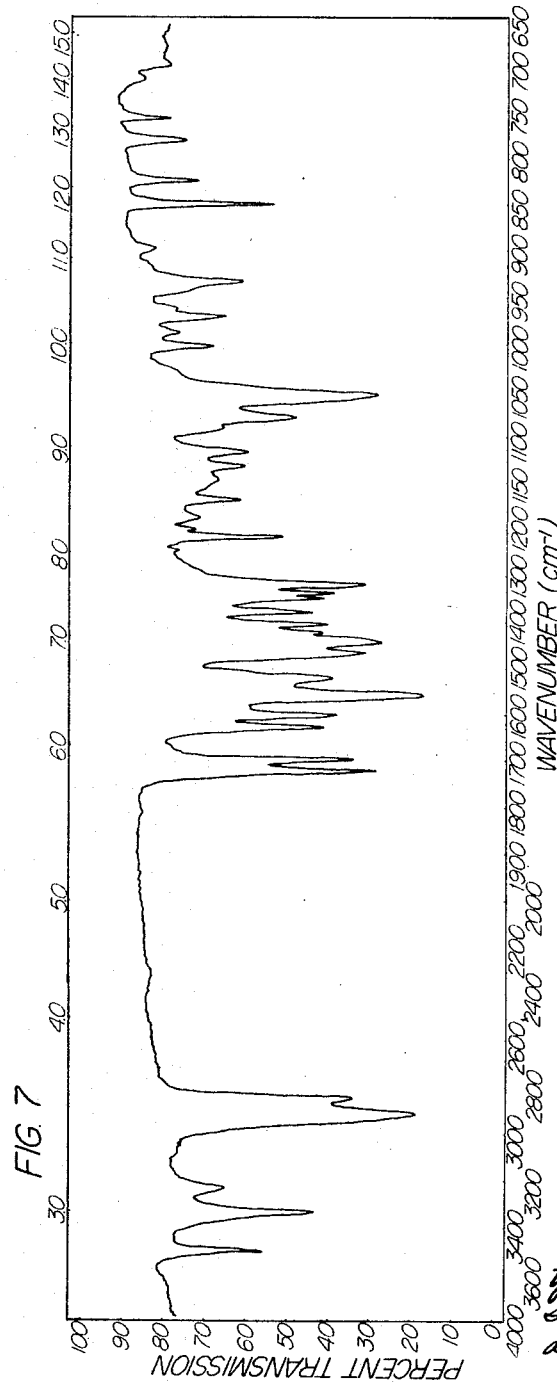

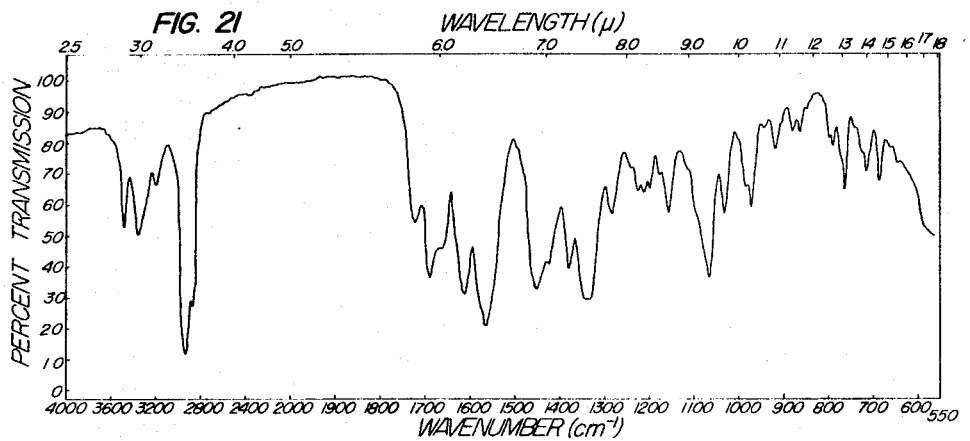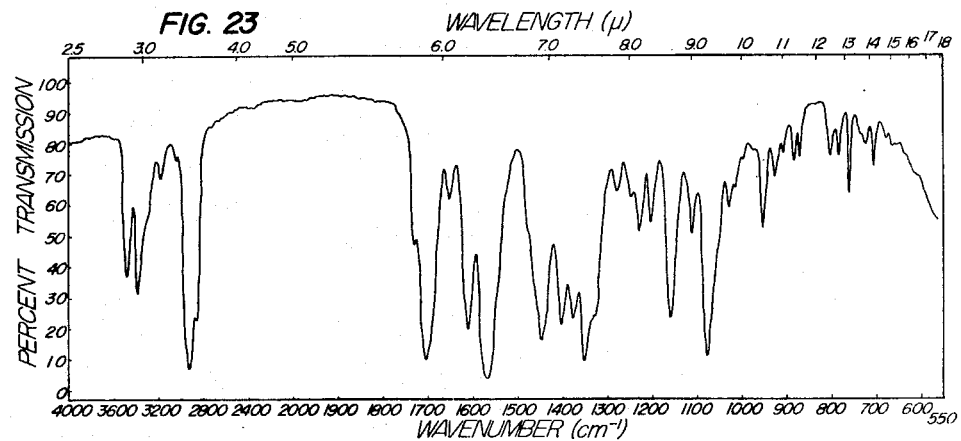

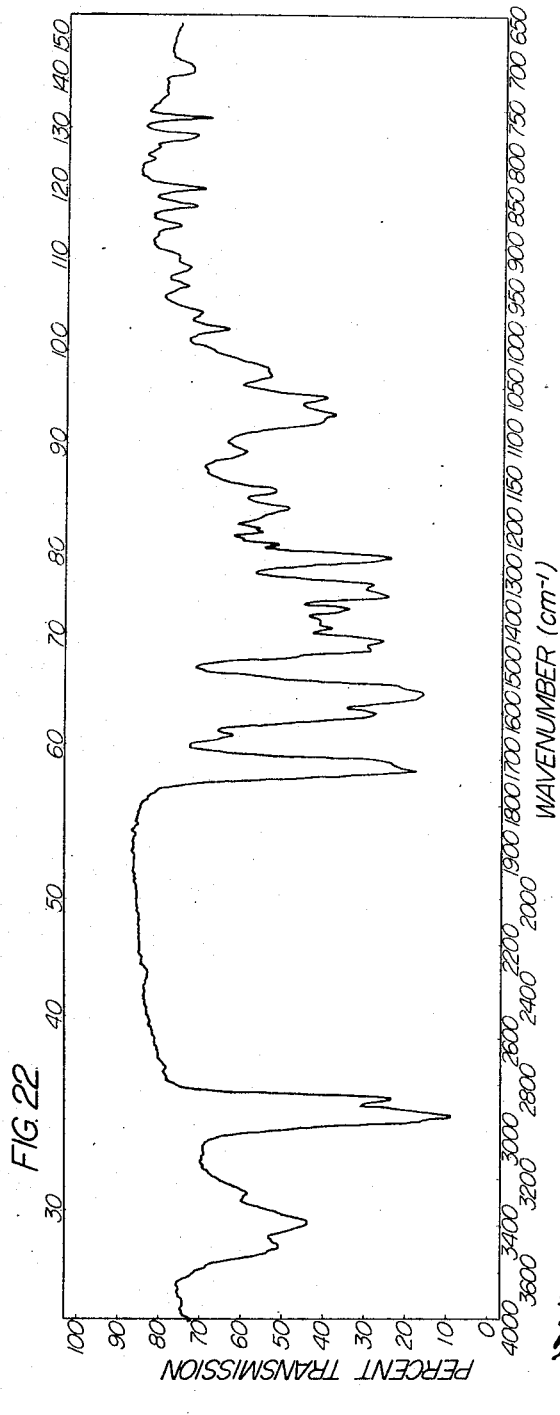

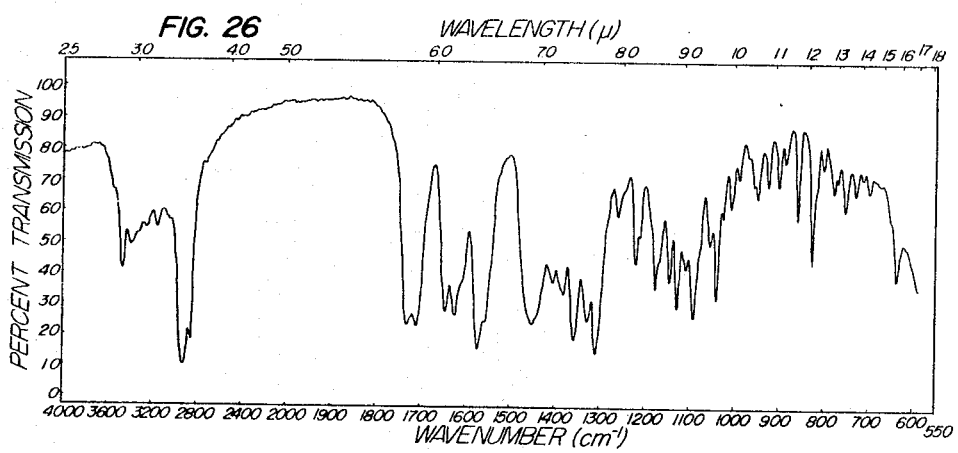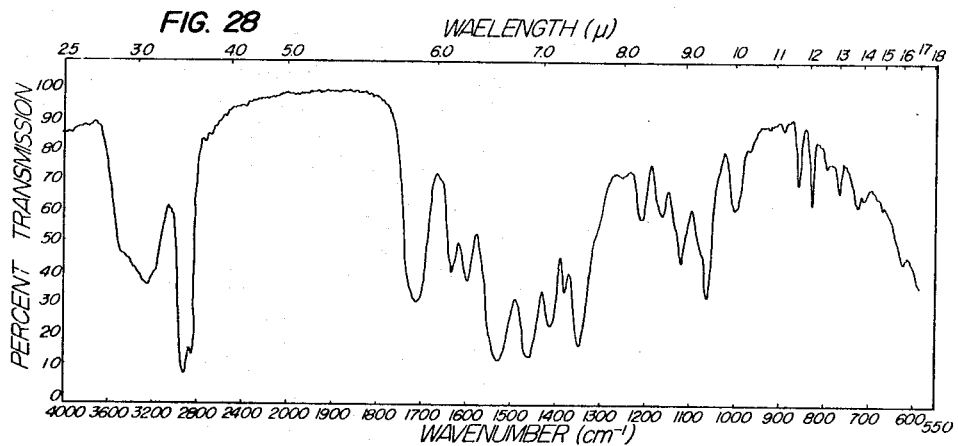

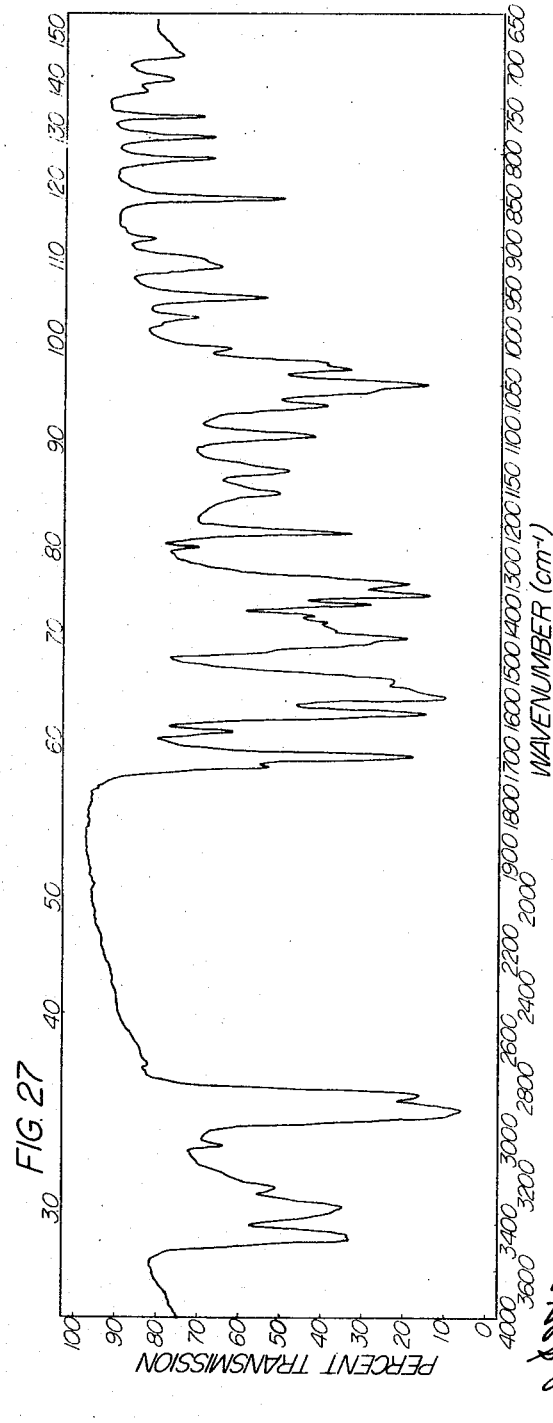

United States Patent Office 3,514,452
Patented May 26, 1970

3,514,452
NOVEL DERIVATIVES OF MITOMYCIN A,
MITOMYCIN B, AND MITOMYCIN C
Masanao Matsui, Yasuhiro Yamada, Shigetoshi Wakaki, and Keizo Uzu, Tokyo, Japan, assignors to Kyowa Hakko Kogyo Co., Ltd., Tokyo, Japan, a corporation of Japan
Filed June 3, 1964, Ser. No. 372,213
Claims priority, application Japan, June 7, 1963, 38/29,270; June 19, 1963, 38/30,932, 38/30,933
Int. Cl. C07d; C09b 23/00, 55/00
U.S. Cl. 260—240                                   1 Claim

ABSTRACT OF THE DISCLOSURE

A compound of the formula:

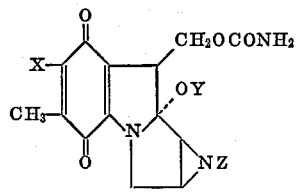

Figure 3:
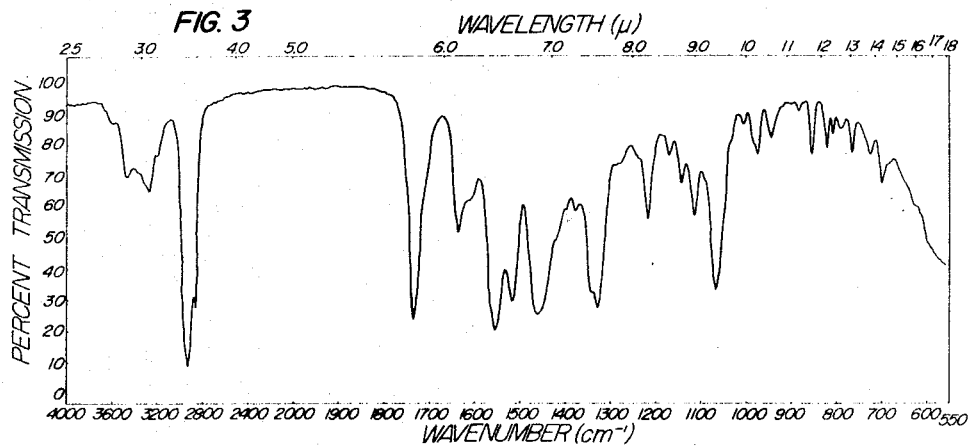

wherein X is selected from the group consisting of $OCH_3$, $NH_2$, $R_1NH$,

and

$R_1$ being an alkyl group having from 1 to 7 carbon atoms, an aryl group, a cyclohexyl group or $(CH_2)_mOH$ wherein $m$ is 2, $R_2$ and $R_3$ being an alkyl group having from 1 to 7 carbon atoms or an aryl group and $R_4$ being $(CH_2)_n$ wherein $n$ is an integer from 2 to 5, Y is selected from the group consisting of H and $CH_3$, except that Y cannot be $CH_3$ when X is $NH_2$ and Z is H or $CH_3$ and Z is selected from the group consisting of H, an alkyl group having from 1 to 4 carbon atoms, an alkanoyl group, a benzoyl group, a nuclear-chlorinated benzoyl group,

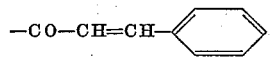

and a lower alkyl ester group, except that Z cannot be H or $CH_3$ when X is $NH_2$ and Y is $CH_3$.

The present invention relates to new antibiotics, more particularly to new derivatives of mitosane-compounds.
In 1956, Hata et al. isolated new antibiotics from the fermented broth of *Streptomyces Caespitosus* and named the antibiotics Mitomycin A and B. In 1958, Wakaki et al. isolated a third antibiotic from the same broth and named it Mitomycin C. Since then, studies on the determination of the above antibiotics have been made and recently, Webb et al. determined the chemical composition of the three compounds as follows:

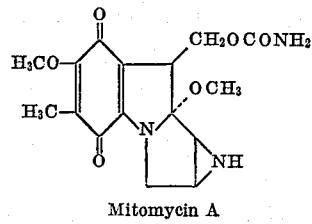

Mitomycin A

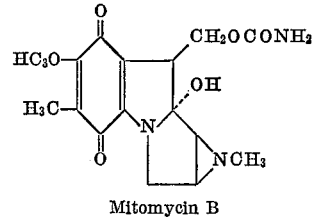

Mitomycin B

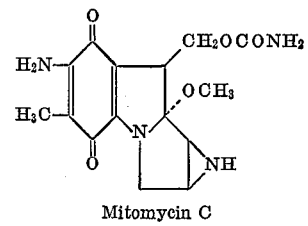

Mitomycin C

These compounds have the following skeleton:

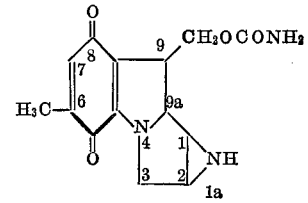

and are called mitosane-compounds.

As antibiotics, Mitomycin A, B and C have excellent effect but also they have a defect i.e., they are poisonous to human blood. In order to obtain less poisonous mitosane-compounds, some researches had been conducted even before the determination of the chemical composition of Mitomycin A, B and C; for example, Monomethyl-mitomycin C or Porifiromycin was synthesized by reacting Mitomycin C and methyliodide in the presence of potassium carbonate. After the determination of the chemical composition of Mitomycin A, B and C, researches to obtain derivatives have been actively conducted. For example, Belgian Pat. 624,559 provides some 6,7 and 1a-substituted derivatives of mitosane-compounds.

The present inventors have conducted man researches to obtain derivatives of mitosane-compounds and have found several types of derivatives.

One object of the present invention is to provide new derivatives of mitosane-compounds, and another object is to provide the processes to produce the said derivatives. Further object of the present invention is to provide less poisonous derivatives of mitosane-compounds and other objects are clear from the following description.

The derivatives of mitosane-compounds of the present invention are represented by the following formula:

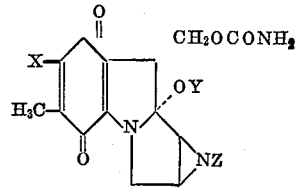

wherein X is

or $NR_3$, $R_1$ and $R_2$ are selected from the group consisting of H, alkyl-group and aryl-group, and $R_3$ is $(CH_2)_n$ ($n$ is an integral number), Y is H or $CH_3$, and Z is selected from the group consisting of H, alkyl-group and alkanoyl-group, excluding the cases of X=NH$_2$, Y=CH$_3$ and Z=H, and X=NH$_2$, Y=CH$_3$ and Z=CH$_3$.

According to the present invention, when an OCH$_3$ group exists at the 7-position of mitosane, the group is replaced by an X group by reacting with XH, and when H exists at the 1a-position of mitosane, the said H is replaced by alkyl by reacting with a alkyl halide such as an alkyl chloride and an alkyl bromide; further, the above H may be replaced by an alkanoyl-group by reacting with aliphatic or aromatic carboxylic acid chloride or such acid anhydride. The OCH$_3$ or OH group at the 9a-position is, however, not affected by the above treatment. Therefore, in the present invention, when Y of the new derivatives is CH$_3$, Mitomycin A or C is favorably used as the starting material while when Y is H, Mitomycin B is used as the starting material. Thus, the reactions in the present invention are generally classified to two types of reactions and more specifically classified to three. They are as follows:

(1) Replacement of OCH$_3$ of 7-position by X by reacting with XH.
(2)
  (i) Replacement of H of 1a-position by alkyl group by reacting with alkyl halide.
  (ii) Replacement of H of 1a-position by alkanoyl group including benzoyl group by reacting with aliphatic or aromatic carboxylic acid halide or such acid anhydride.

The above-mentioned reactions are the principal reactions in the present invention, and following are the illustrative explanations of the reactions and intermediates of the present invention somewhat more in detail.

(1) Mitomycin A is dissolved in a suitable solvent such as acetone. Alkyl halide and alkali metal carbinate are added to the solution and heated for several hours with reflux. Alkali metal carbonate is filtered off from the reaction mixture and the filtrate is concentrated by evaporation. The concentrate is adsorbed on silica gel packed in a column, and then developed and eluted by using ethyl acetate. The main fraction is concentrated, red colored crystals, being obtained. The product has the chemical composition of the formula:

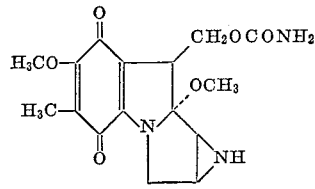

(wherein Z is alkyl).

The above-mentioned reaction is shown by the following reaction scheme

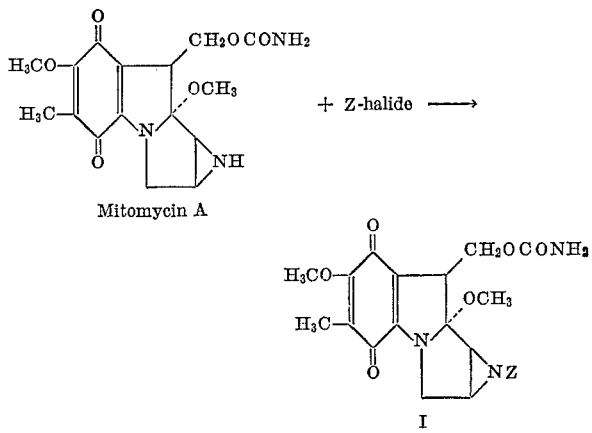

(wherein Z is alkyl).

The compound I is dissolved in alcohol such as methanol and an excessive amount of amine (XH) is added. The mixture is allowed to stand for a while, whereupon the color of the mixture changes to bluish from red purple. The reaction mixture is then concentrated and if crystallization takes place, the crystals are filtered, and the filrtate is concentrated. The concentrate is adsorbed on silica packed in a column and developed and eluated by using as solvent acetone: ethyl acetate=1:1. The main fraction is evaporated. The crystallized product is separated. If crystallization does not take place, ether is added to the reaction mixture and the precipitate is separated. The reaction is shown by the following reaction scheme;

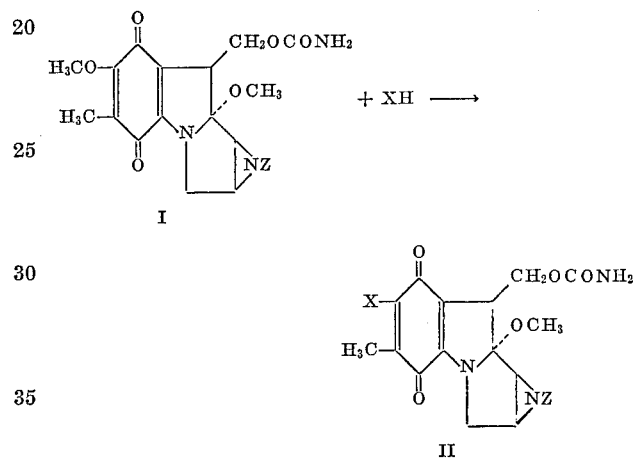

(2) Mitomycin A is dissoived in a suitable solvent such as tetrahydrofuran, dioxane, benzene, ether, etc. Triethylamine and carboxylic acid chloride (RCOCl) or carboxylic acid anhydride (RCO—O—OCH) are added to the solution and the reaction mixture is stirred, whereupon the hydrochloric acid salt of triethylamine is precipitated and filtered off. The filtrate is dried and the residue is dissolved in ethyl acetate and a chromatograph-treatment is carried out as described in the first part of (1) supra. The main fraction is concentrated and crystallization is effected. If necessary, either is added to crystallize the product. The reaction is represented by the reaction scheme;

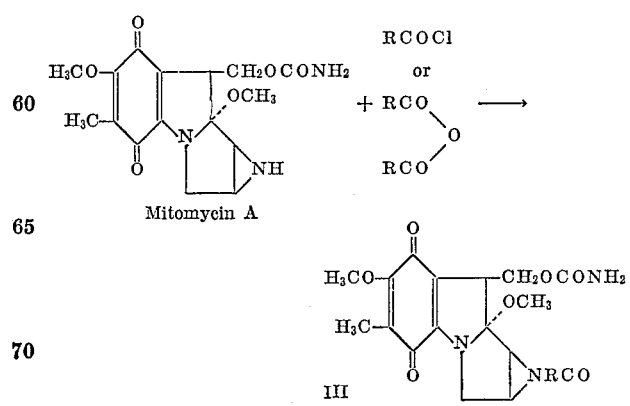

(R is alkyl or aryl group.)

The compound III is treated as described in the latter part of (1) and the reaction is represented by the reaction scheme;

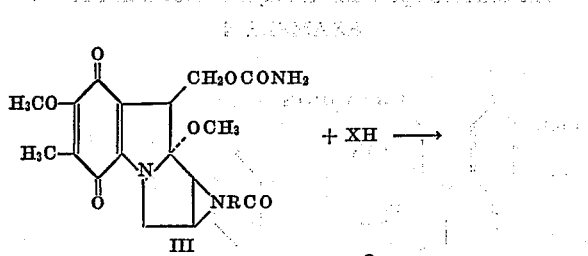

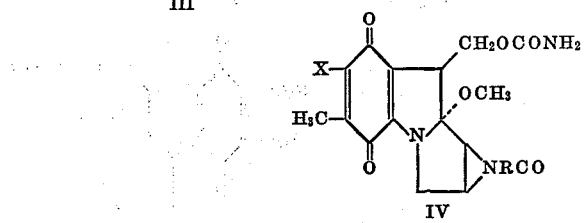

(3) The process is the combination of the latter part of (1) and the first part of (1) and is expressed by the reaction scheme;

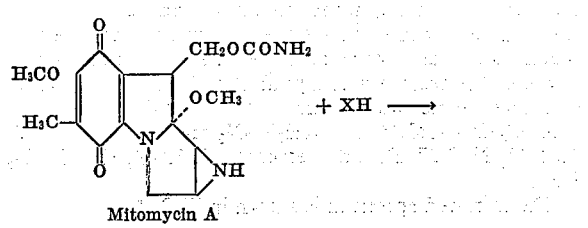

Mitomycin A

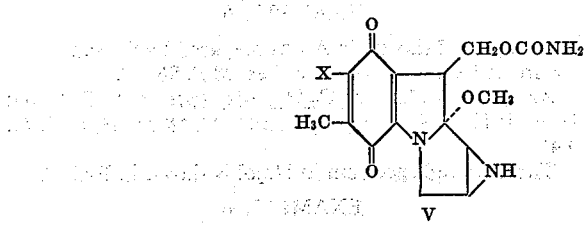

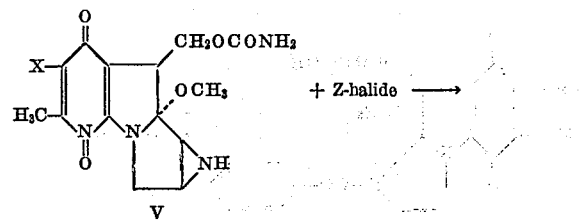

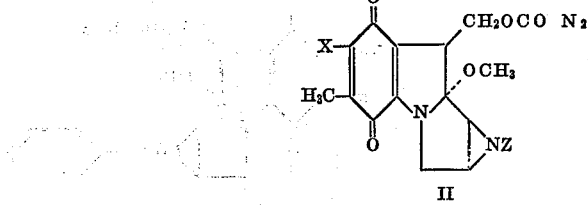

(Z is alkyl).

(4) The process is the combination of the latter part of (1) and the first part of (2) and is expressed by the reaction scheme;

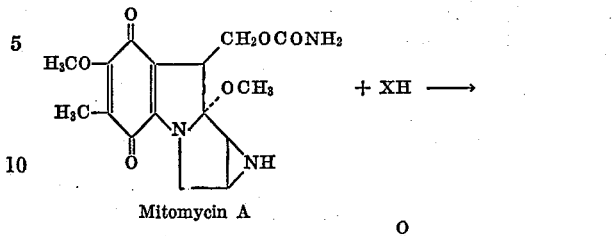

Mitomycin A

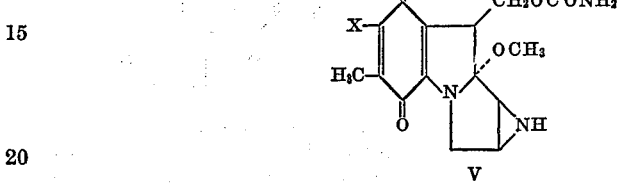

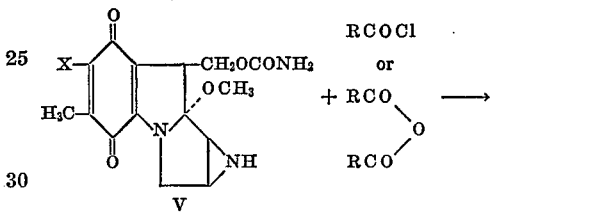

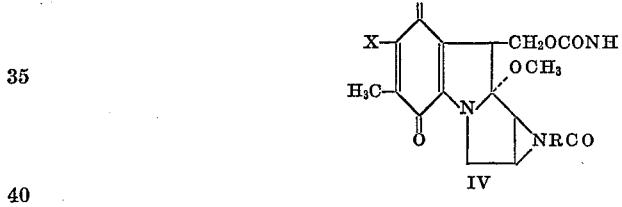

(5) Mitomycin B is treated as described in the latter part of (1). The reaction is represented by the reaction scheme;

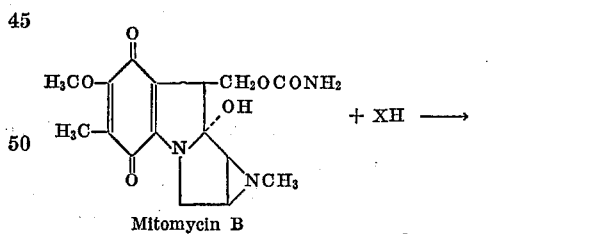

Mitomycin B

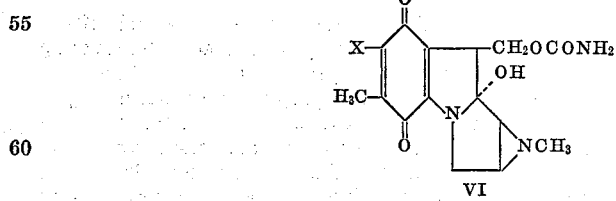

As is clear from the above description, 1a-position substitution can be carried out prior to 7-position substitution and vice versa. Further, as is clear from the before-mentioned description, the compounds II, IV, and VI are new derivatives of the present invention; moreover, the compounds I, III and V are also within the scope of the present invention, and they are not only important as the intermediates but also may have excellent antibiotic activity.

The following examples are only for more specifically illustrating the present invention but are not intended to be limitative of the present invention.

EXAMPLE 1

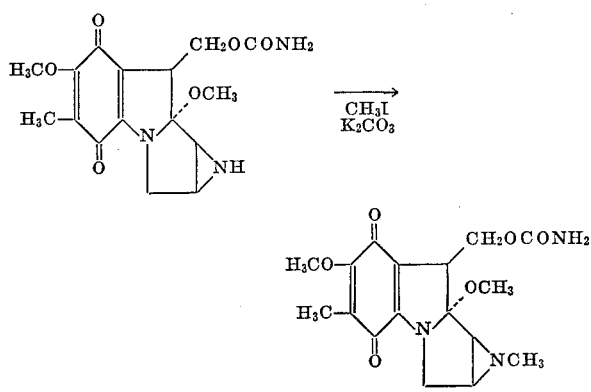

To 250 mg. of Mitomycin A dissolved in 10 ml. of acetone was added 500 mg. of anhydrous potassium carbonate and 1 ml. of methyl iodide. The mixture was refluxed with stirring for 3 hours. The reaction mixture was filtered to remove potassium carbonate and the filtrate was evaporated under reduced pressure to dryness. The red colored residue was dissolved in 5 ml. of ethyl acetate and the solution was introduced onto a column (1.5×20 cm.) of silicic acid. Development with ethyl acetate gave two bands of red color. The first major band contained the reaction product and the second minor band contained the original Mitomycin A. The first band was eluted and the eluate was evaporated to dryness and the residue was crystallized from ether. 150 mg. of the red colored methyl Mitomycin A was obtained. M.P. 165° C.

Analysis.—Calc'd for $C_{17}H_{21}O_6N_3$ (percent); C, 56.19; H, 5.83; N, 11.57. Found (percent): C, 56.05; H, 5.70; N, 11.40.

The infrared spectrum in Nujol is shown in FIG. 1.

EXAMPLE 2

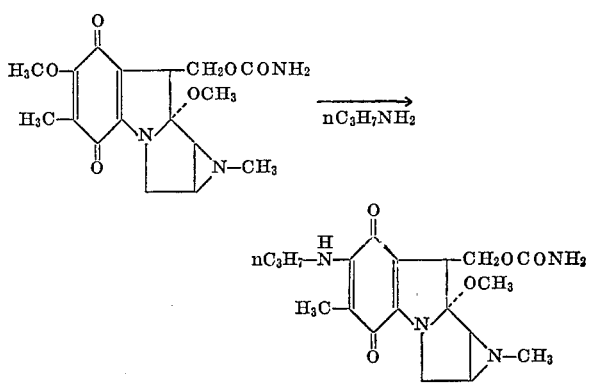

To 50 mg. of 1a-methyl Mitomycin A dissolved in 10 ml. of methanol was introduced n-propylamine. After standing for 20 minutes at room temperature, the color of the solution was changed to bluish purple from reddish purple. The reaction mixture was evaporated under reduced pressure to drynes. The residue was chromatographed on silicic acid using ethyl acetate as the solvent system. The bluish band was developed and eluted. The eluate was evaporated under reduced pressure. The residue was crystallized from ethyl acetate-ether. 40 mg. of purple needles was obtained. M.P. 178° C.

Analysis.—Calc'd for $C_{19}H_{26}O_5N_4$ (percent): C, 58.45; H, 6.71; N, 14.35. Found (percent): C, 58.20; 6.50; N, 14.10.

The infra-red spectrum thereof in Nujol is shown in FIG. 2.

EXAMPLE 3

1a-methyl 7a-ethyl Mitomycin C was prepared by the same procedure as Example 2. Purple needles. M.P. 170° C.

Analysis.—Calc'd for $C_{18}H_{24}O_5N_4$ (percent): C, 57.43; H, 6.71; N, 14.35. Found (percent): C, 58.20; H, 6.50; N, 14.98.

The infrared spectrum in Nujol is shown in FIG. 3.

EXAMPLE 4

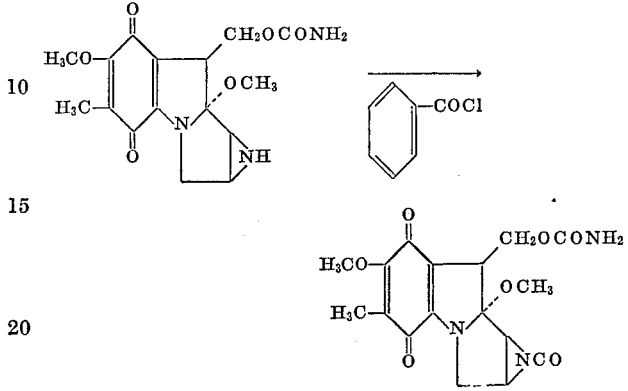

500 mg. of Mitomycin A and 1 ml. of triethylamine were dissolved in 20 ml. of anhydrous tetrahydrofuran. A solution of 190 mg. of benzoyl chloride in 3 ml. of tetrahydrofuran was introduced dropwise with stirring at room temperature. When the mixture was stirred for 15 minutes, crystalline triethylamine hydrochloride was precipitated gradually. The reaction mixture was filtered to remove triethylamine hydrochloride and the filtrate was evaporated to dryness. The residue was dissolved in ethyl acetate (5 ml.) and chromatographed on silicic acid (2× 30 cm.). Development with ethyl acetate gave two bands. The first major band was eluted and the eluate was evaporated to dryness. The residue was crystallized from ether. 430 mg. of purple needles was obtained. M.P. 158° C.

Analysis.—Calc'd for $C_{23}H_{23}O_7N_3$ (percent): C, 60.92; H, 5.11; N, 9.27. Found (percent): C, 60.49; H, 5.01; N, 9.37.

Figure 4:
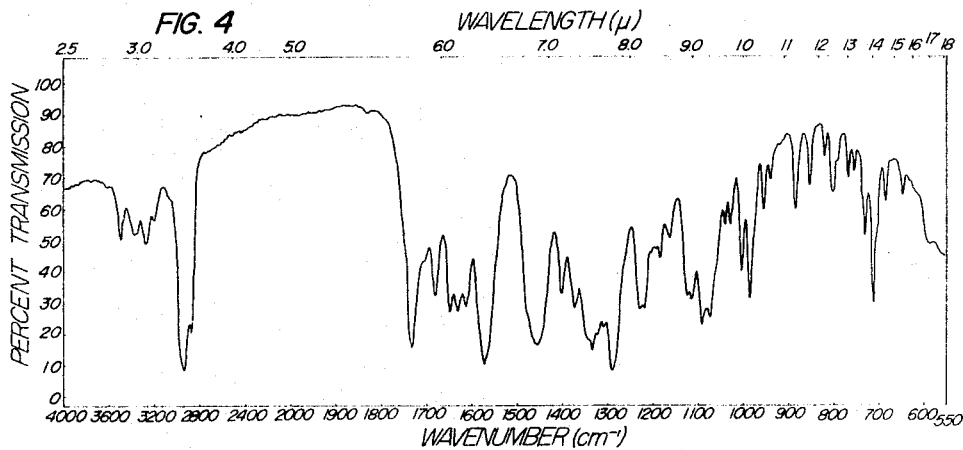

The infra-red spectrum is shown in FIG. 4.

EXAMPLE 5

1a-caproyl Mitomycin A was prepared by the same procedure as Example 4. Red needles. M.P. 98° C.

Analysis.—Calc'd for $C_{22}H_{29}O_7N_3$ (percent): C, 59.05; H, 6.53; N, 9.39. Found (percent): C, 58.75; H, 6.45; N, 9.45.

The infra-red spectrum in Nujol is shown in FIG. 5.

EXAMPLE 6

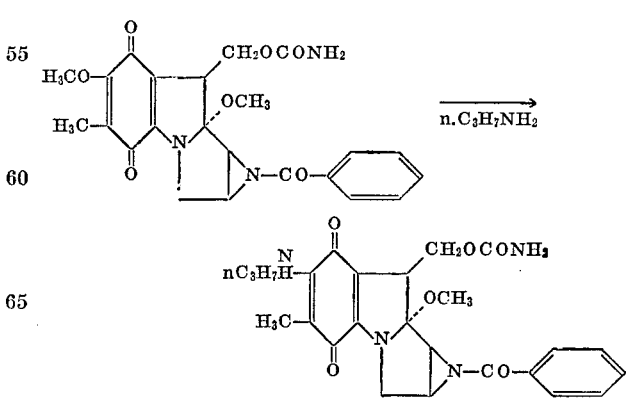

200 mg. of 1a-benzoyl Mitomycin A was dissolved in 10 ml. of methanol. 1 ml. of n-proplamine was introduced to this solution. After standing for a few minutes, the bluish solution was evaporated under reduced pressure. The residue was crystallized from methanol. 145 mg. of bluish needles were obtained. M.P. 120° C.

*Analysis.*—Calc'd for $C_{25}H_{28}O_6N_4$ (percent); C, 62.48; H, 5.87; N, 11.66. Found (percent): C, 62.10; H, 5.60; N, 11.40.

The infrared spectrum in Nujol is shown in FIG. 6.

EXAMPLE 7

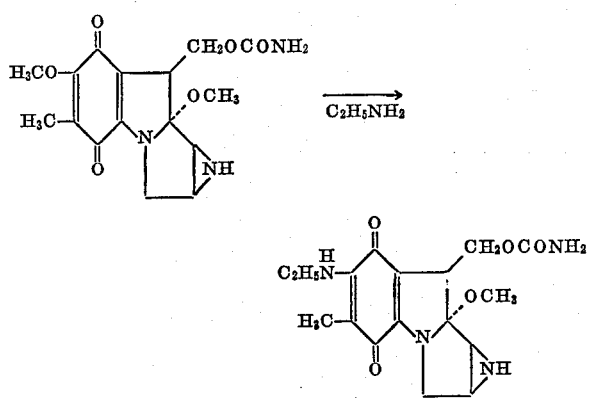

To 500 mg. of Mitomycin A dissolved in 5 ml. of methanol was introduced 2 ml. of 70% ethylamine. After standing for 20 minutes at room temperature, the color of the solution was changed to bluish purple from reddish purple and dark purple needles were deposited in this solution. 420 mg. of crystal was obtained by filtration. M.P. above 300°.

*Analysis.*—Calc'd for $C_{17}H_{22}O_5N_4$ (percent): C, 56.34; H, 6.12; N, 15.46. Found (percent): C, 56.32; H, 6.15; N, 15.03.

The infrared spectrum in Nujol is shown in FIG. 7.

EXAMPLE 8

The following compounds were prepared by the same procedure as in Example 7. The character of these compounds are shown in the following table:

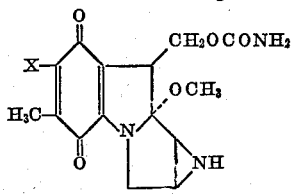

EXAMPLE 9

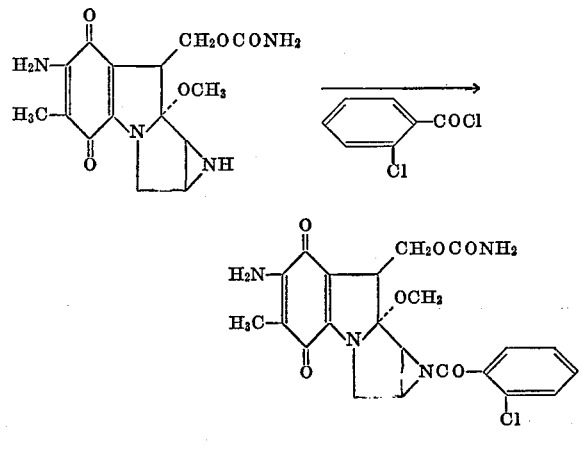

1 g. of Mitomycin C was dissolved in 50 ml. of anhydrous tetrahydrofuran and 2 ml. of triethylamine was added to this solution. 500 mg. of o-chlorobenzoyl chloride dissolved in 5 ml. of anhydrous benzene was introduced dropwise under stirring at room temperature. When the mixture was stirred for 15 minutes, triethylamine hydrochloride was precipiated gradually. The reaction mixture was filtered to remove triethylamine hydrochloride and the filtrate was evaporated under reduced pressure to dryness. The residue was dissolved in 10 ml. of ethyl acetate and chromatographed on silicic acid (2× 40 cm. column). Development with ethyl acetate gave two bands of blue. The first major band contained the reaction product and the second minor band contained a small amount of original compound. The first band was eluted and the eluate was evaporated and the residue was crystallized from methanol. 1050 mg. of dark bluish needles was obtained. M.P. 200° C.

*Analysis.*—Calc'd for $C_{22}H_{21}O_6N_4Cl$ (percent): C, 55.84; H, 4.48; N, 11.85. Found (percent): C, 55.68; H, 4.49; N, 12.21.

Figure 17:
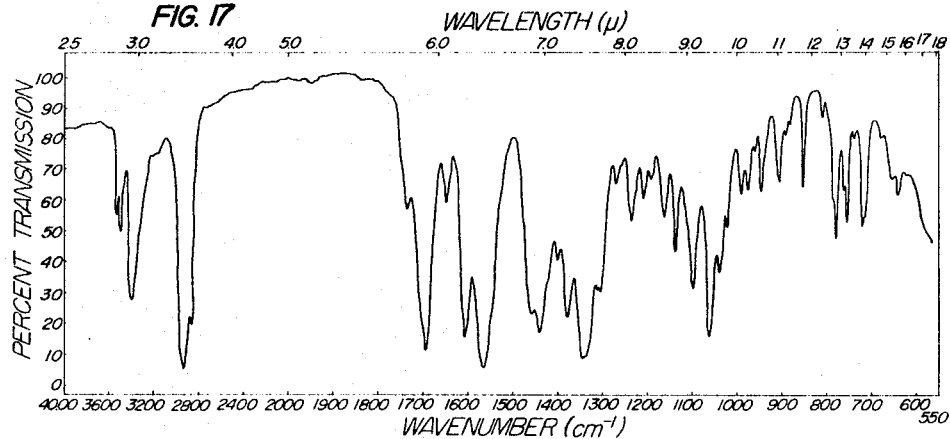

The infra-red spectrum Nujol is shown in FIG. 17.

EXAMPLE 10

The following compounds were prepared by the same procedure as in Example 9.

Figure 8:
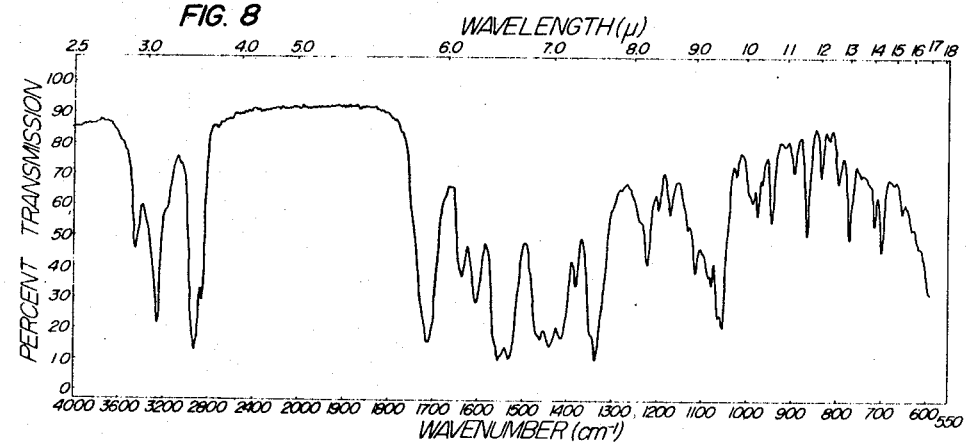
Figure 9:
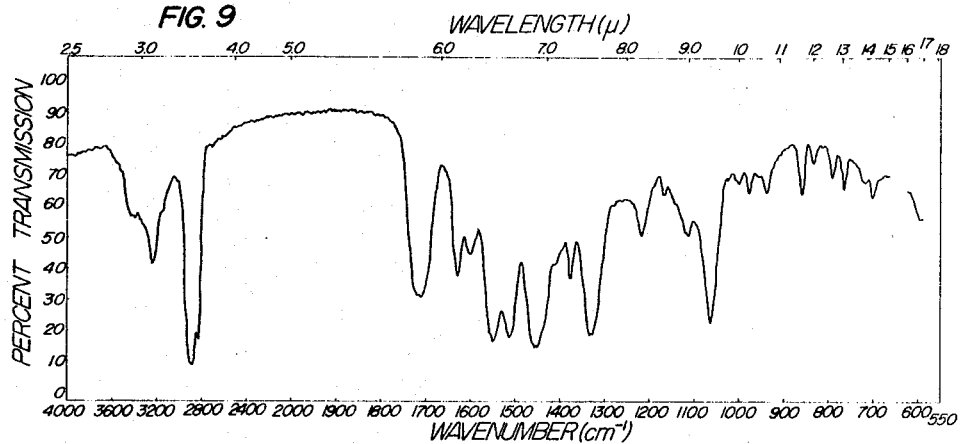
Figure 10:
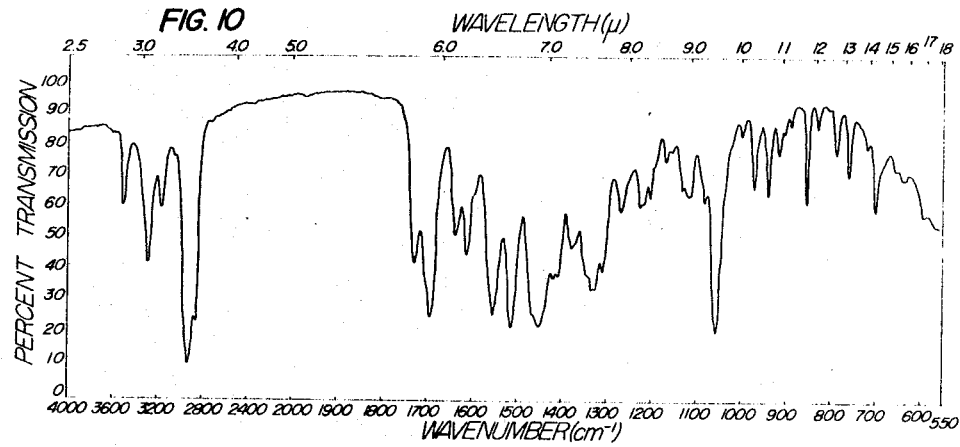
Figure 11:
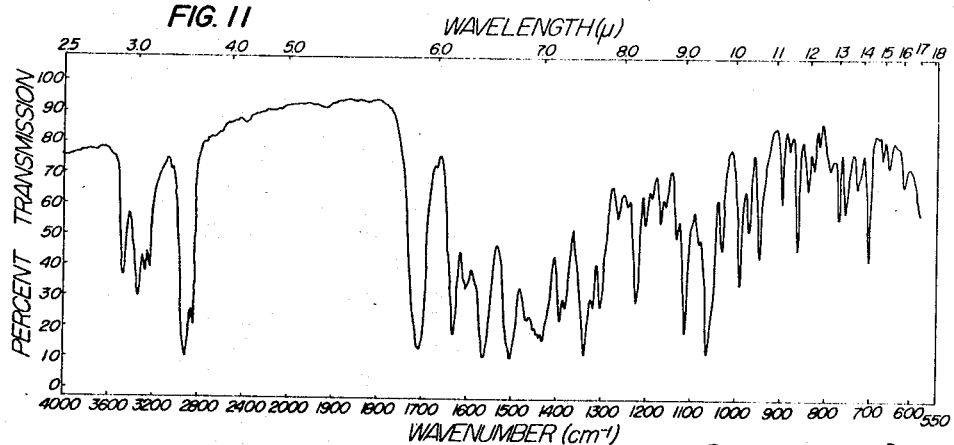
Figure 12:
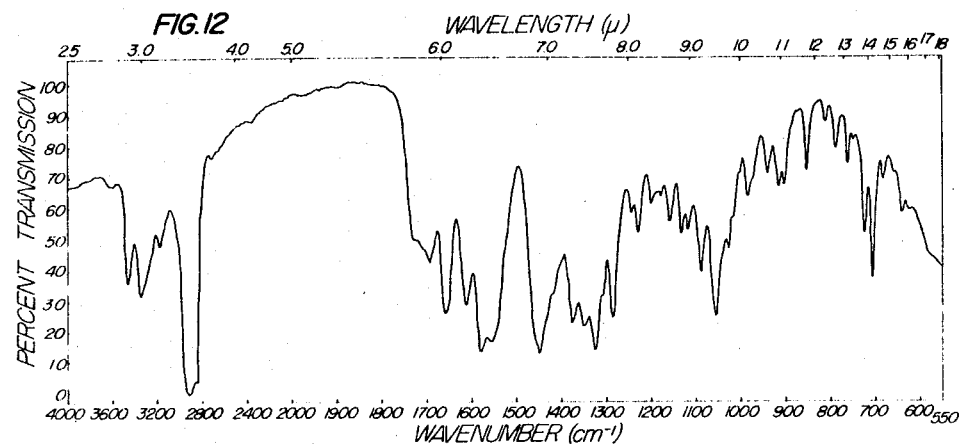
Figure 14:
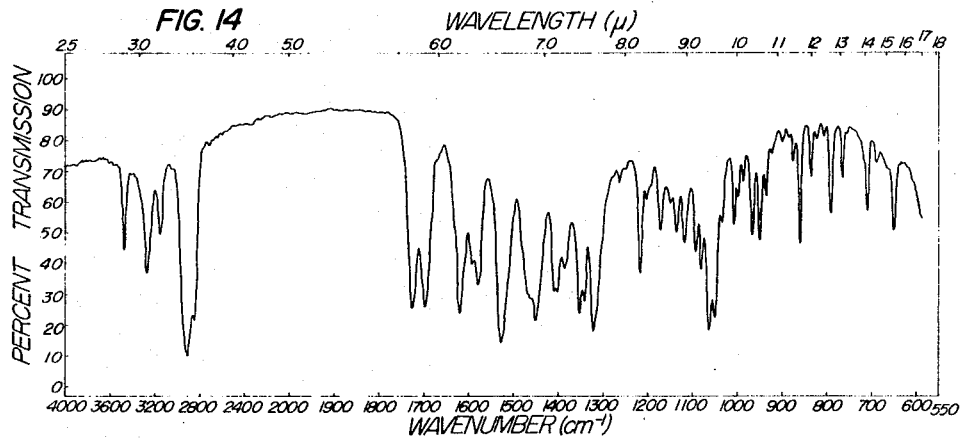
Figure 13:
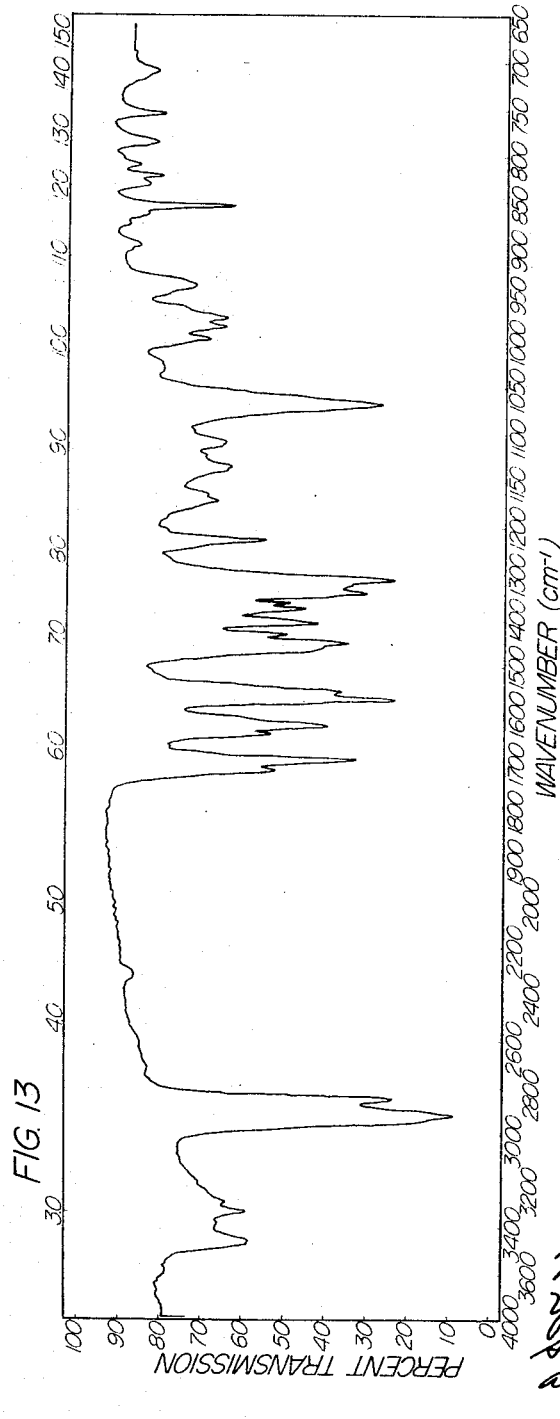
Figure 15:
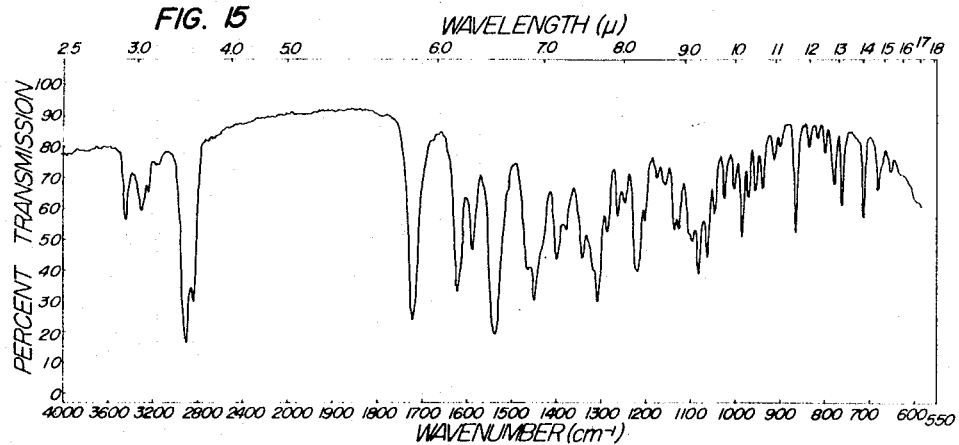
Figure 16:
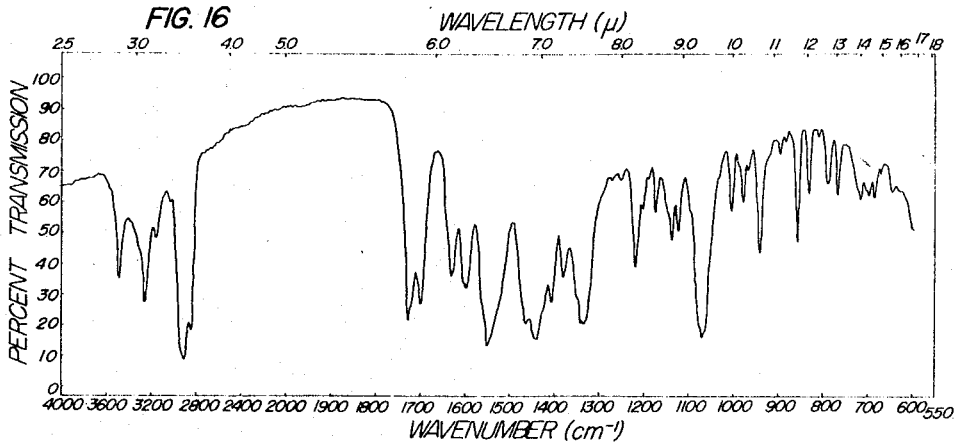

| X | | M.P. | | Calculated | | | Found | | | The infrared spectrum (Nujol) |
|---|---|---|---|---|---|---|---|---|---|---|
| | | | | C | H | N | C | H | N | |
| $CH_3$—NH— | Bluish needles | Above 300° C. | $C_{16}H_{20}O_5N_4$ | 55.16 | 5.79 | 16.08 | 55.30 | 5.81 | 16.01 | Fig. 8. |
| $\begin{array}{c}CH_3\\ \diagdown\\ CH-\\ \diagup\\ CH_3\end{array}$ | Bluish amorph | do | $C_{18}H_{24}O_5N_4$ | 57.43 | 6.43 | 14.89 | 57.20 | 6.15 | 14.70 | Fig. 9. |
| $CH_3$—$CH_2$—$CH_2$—NH | Bluish needles | do | $C_{18}H_{24}O_5N_4$ | 57.43 | 6.43 | 14.89 | 57.10 | 6.20 | 14.95 | Fig. 10. |
| ⟨ ⟩—NH— | do | do | $C_{21}H_{28}O_5N_4$ | 56.82 | 7.42 | 14.73 | 56.50 | 7.60 | 14.40 | Fig. 11. |
| $\begin{array}{c}CH_3\\ \diagdown\\ N-\\ \diagup\\ CH_3\end{array}$ | Dark greenish needles | do | $C_{17}H_{22}O_5N_4$ | 56.34 | 6.12 | 15.46 | 56.50 | 6.61 | 15.20 | Fig. 12. |
| ▷N— | Brownish plate | do | $C_{17}H_{20}O_5N_4$ | 56.66 | 5.59 | 15.53 | 56.40 | 5.40 | 15.30 | Fig. 13. |
| ⬠N | Greenish needles | do | $C_{19}H_{24}O_5N_4$ | 58.76 | 6.23 | 14.43 | 58.69 | 6.25 | 13.93 | Fig. 14. |
| ⬡N— | do | do | $C_{20}H_{26}O_5N_4$ | 59.69 | 6.51 | 13.92 | 59.72 | 6.77 | 13.67 | Fig. 15. |
| $CH_2$—$CH_2$—NH—<br>\|<br>OH | Bluish plate | do | $C_{17}H_{22}O_5N_4$ | 53.96 | 5.86 | 14.81 | 53.47 | 5.56 | 14.70 | Fig. 16. |

The character of these compounds is shown in the following table:

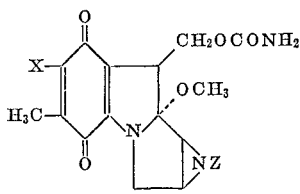

*Analysis.*—Calc'd for $C_{19}H_{26}O_5N_4$ (percent): C, 58.45; H, 6.71; N, 14.35. Found (percent): C, 58.55; H, 6.55; N, 14.20.

The infra-red spectrum in Nujol is shown in FIG. 2.

EXAMPLE 12

1a-methyl-7a-ethyl Mitomycin C was prepared by the same procedure as in Example 1. M.P. 170° C.

*Analysis.*—Calc'd for $C_{18}H_{24}O_5N_4$ (percent): C, 57.43; H, 6.43; N, 14.89. Found (percent): C, 57.20; H, 6.50; N, 15.05.

Figure 18:
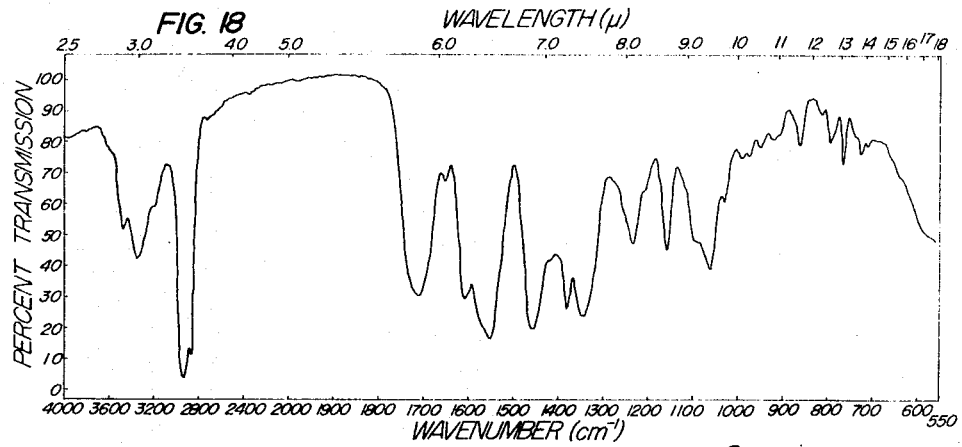
Figure 19:
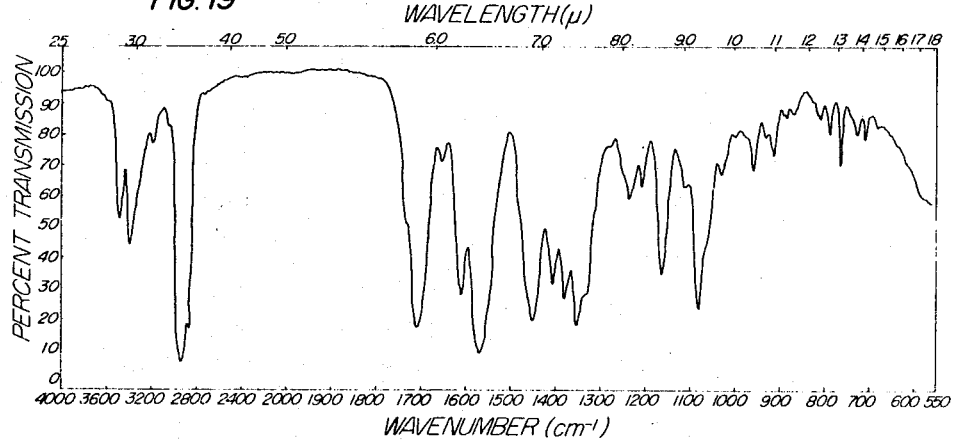
Figure 20:
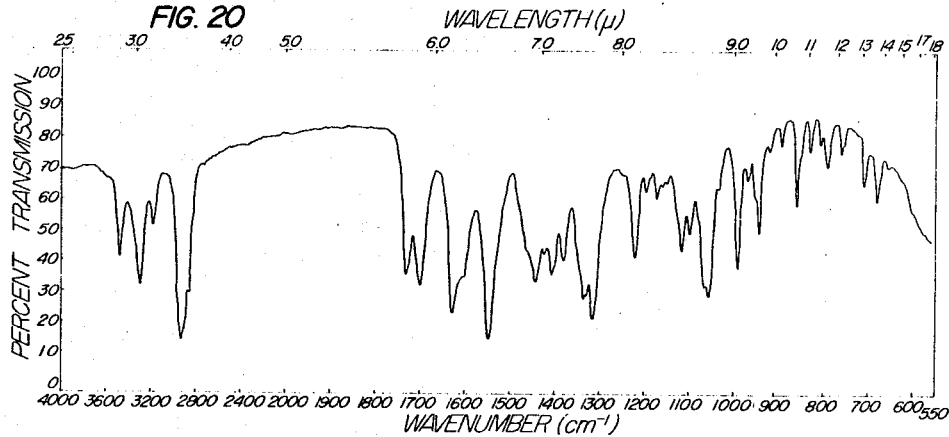
Figure 24:
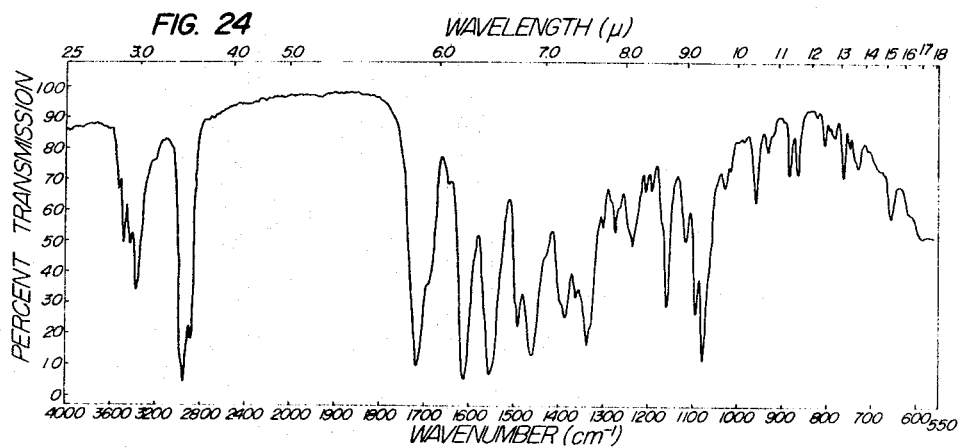
Figure 25:
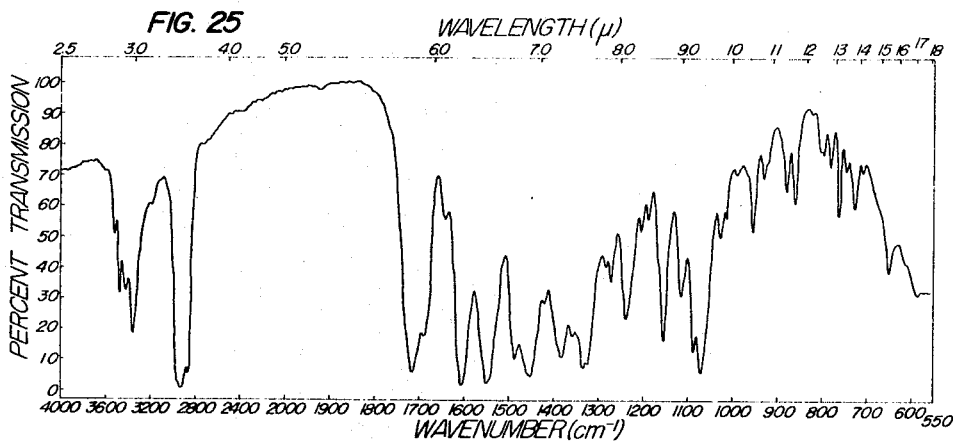

| X | Z | | Formula | Analysis | | | | | | The infrared spectrum (Nujol) |
|---|---|---|---|---|---|---|---|---|---|---|
| | | | | Calculated | | | Found | | | |
| | | | | C | H | N | C | H | N | |
| —$NH_2$ | $C_2H_5CO$ | Bluish needles | $C_{18}H_{22}O_6N_4$ | 55.38 | 5.68 | 14.35 | 55.25 | 5.75 | 14.02 | Fig. 18. |
| —$NH_2$ | $C_3H_7CO$ | do | $C_{19}H_{24}O_6N_4$ | 56.43 | 5.98 | 13.86 | 56.50 | 5.80 | 13.95 | Fig. 19. |
| —$NH_2$ | ⌬—CO | do | $C_{22}H_{22}O_6N_4$ | 60.27 | 5.06 | 12.78 | 60.00 | 5.20 | 12.50 | Fig. 20. |
| —$NH_2$ | ⌬—CH=CH—CO | do | $C_{24}H_{24}O_6N_4$ | 62.06 | 5.21 | 12.06 | 61.86 | 5.05 | 12.30 | Fig. 21 |
| —$NH_2$ | $C_2H_5OCO$— | do | $C_{18}H_{22}O_7N_4$ | 53.20 | 5.46 | 13.76 | 53.05 | 5.61 | 13.65 | Fig. 22. |
| —$NH_2$ | $nC_4H_9CO$— | do | $C_{20}H_{26}O_6N_4$ | 59.40 | 6.26 | 13.39 | 57.66 | 6.38 | 13.51 | Fig. 23. |
| —$NH_2$ | $nC_5H_{11}CO$— | do | $C_{21}H_{28}O_6N_4$ | 58.32 | 6.53 | 12.96 | 58.52 | 6.78 | 12.87 | Fig. 24. |
| —$NH_2$ | $nC_6H_{13}CO$— | do | $C_{22}H_{30}O_6N_4$ | 59.18 | 6.77 | 12.51 | 58.85 | 6.72 | 12.58 | Fig. 25. |

EXAMPLE 11

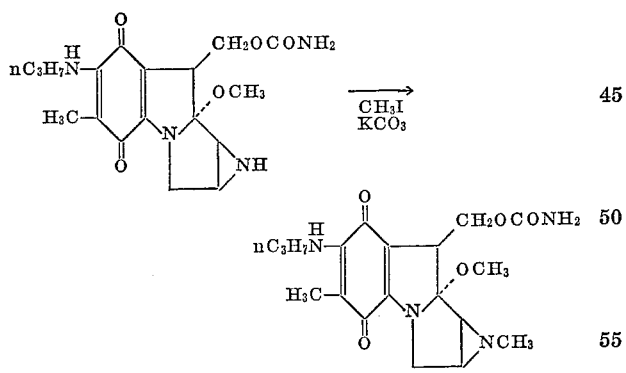

To 250 mg. of 7a-propyl Mitomycin C dissolved in anhydrous tetrahydrofuran was added 500 mg. of anhydrous potassium carbonate and 1 ml. of methyl iodide. The mixture was refluxed with stirring for 4 hours. The reaction mixture was filtered to remove potassium carbonate and the filtrate was evaporated under reduced pressure to dryness. The bluish purple residue was dissolved in 10 ml. of ethyl acetate and chromatographed on silicic acid. Development with ethyl acetate gave two bands of bluish purple. The first major band contained the reaction product which was eluted and the eluate was evaporated to dryness. The residue was crystallized from ethyl acetate-ether. 155 mg. of bluish needles were obtained. M.P. 178° C.

The infra-red spectrum in Nujol is shown in FIG. 3.

EXAMPLE 13

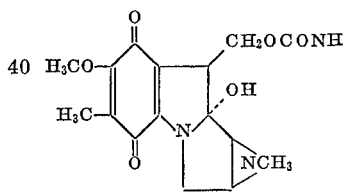

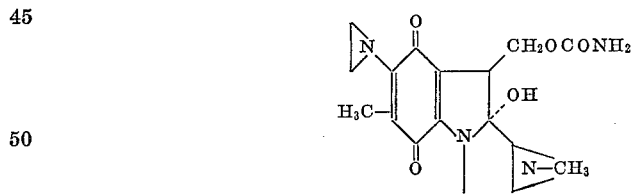

1 g. of Mitomycin B was dissolved in 20 ml. of methanol and 1 ml. of ethyleneimine was introduced in this solution. After standing for 10 minutes at room temperature, the solution was evaporated in vacuo. The residue was crystallized from ethyl acetate. 830 mg. of reddish brown needles were obtained. M.P. (decomp.) 170–180° C.

*Analysis.*—Calc'd for $C_{17}H_{20}O_5N_4$ (percent): C, 56.66; H, 5.59; N, 15.55. Found (percent): C, 56.40; H, 5.84; N, 15.84.

The infra-red spectrum in Nujol is shown in FIG. 26.

EXAMPLE 14

The following two compounds were prepared by the same procedure as in Example 13.

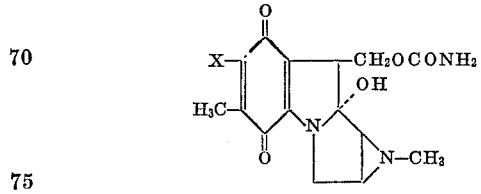

| X | Formula | Degrees M.P., | Analysis Calculated | | | Analysis Found | | | The infrared spectrum (Nujol) |
|---|---|---|---|---|---|---|---|---|---|
| | | | C | H | N | C | H | N | |
| $NH_2$ | Purple needles | $C_{15}H_{18}O_5N_4$ | 235 | 53.88 | 5.43 | 16.76 | 53.59 | 5.58 | 16.38 | Fig. 27. |
| $NH-CH_3$ | ...do... | $C_{16}H_{20}O_5N_4$ | 155 | 55.16 | 5.79 | 16.08 | 55.35 | 5.58 | 15.75 | Fig. 28. |

Antibacterial activities were studied on all these derivatives above mentioned. The minimum inhibition concentrations thereof were measured by the Agar plate method.

These results are summarized in the following table. All these derivatives show strong antibacterial activities.

ANTIBACTERIAL ACTIVITIES OF MITOMYCIN DERIVATIVES

| Name of antibiotics: | 1a-propionyl-mitomycin (hereinafter M.C.) | 1a-butynyl —M.C. | 1a-benzoyl —M.C. | 1a-ethoxy carbonyl —M. |
|---|---|---|---|---|
| X | $H_2N-$ | $H_2N-$ | $H_2N-$ | $H_2N-$ |
| Y | $CH_3-$ | $CH_3-$ | $CH_3-$ | $CH_3-$ |
| Z | $CH_3CH_2CO-$ | $CH_3CH_2-CH_2-CO-$ | $-CO-$ | $C_2H_5OCO-$ |
| Staphylococcus aureus 209P | 0.78 | 1.56 | 3.12 | 1.56 |
| Sarcina lutea PcI 1001 | 0.39 | 3.12 | 6.25 | 6.25 |
| Bacillus subtilis ATCC 6633 | 0.39 | 0.78 | 3.12 | 1.56 |
| Salmonella typhi 379 | 25 | 6.25 | 25 | 50 |
| Shigella flexneri Za 3196 | 0.048 | 0.097 | 0.195 | 3.12 |
| Klebsiella pneumoniae 0/10 | 6.25 | 12.5 | 50 | 50 |
| Proteus X19 | 6.25 | 12.5 | 50 | 50 |
| Escherichia coli K-12 | 3.12 | 3.12 | 25 | 50 |
| Pseudomonas aeruginosa 35 | 1.25 | 25 | 50 | 50 |
| Vibrio comma 62 | 25 | 50 | 50 | 12.5 |
| Mycobacterium tuberculosis 607 | 0.097 | 0.39 | 0.78 | 1.56 |
| Streptococcus haemolyticus 68 | 0.097 | 0.195 | 0.195 | 0.39 |
| Streptococcus faecalis 5 | 0.78 | 1.56 | 6.25 | 0.78 |
| Diplococcus pneumoniae 1-19 | 0.78 | 1.56 | 3.12 | 0.048 |
| Corynebacterium diphtheriae 92 | 0.195 | 3.12 | 0.195 | 0.195 |

| Name of antibiotics: | 1a-cinnamoyl—M.C. | 1a-O-chlorobenzoyl —M.C. | 1a-methyl 7 ethyleneimino-9a-hydroxy—Mitosane | 1a-methyl 7 methylamino 9a-hydroxy—Mitosane |
|---|---|---|---|---|
| X | $H_2N-$ | $H_2N-$ | $(CH_2)_2N-$ | $CH_3NH-$ |
| Y | $CH_3-$ | $CH_3-$ | $H-$ | $H-$ |
| Z | $-CH=CH-CO-$ | 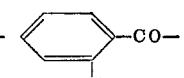$-CO-$ | $CH_3-$ | $CH_3-$ |
| Staphylococcus aureus 209P | 0.78 | 3.12 | 0.097 | 12.5 |
| Sarcina lutea PcI 1001 | 1.56 | 2 | 0.048 | 12.5 |
| Bacillus subtilis ATCC 6633 | 0.78 | 3.12 | 0.39 | 6.25 |
| Salmonella typhi 379 | 25 | 50 | 16.25 | 50 |
| Shigella flexneri Za 3196 | 12.5 | 25 | 0.78 | 50 |
| Klebsiella pneufoniae 0/10 | 12.5 | 25 | 0.39 | 50 |
| Proteus X19 | 6.25 | 25 | 3.12 | 50 |
| Escherichia coli K-12 | 6.25 | 25 | 6.25 | 50 |
| Pseudomonas aeruginosa 35 | 6.25 | 25 | 6.25 | 50 |
| Vibrio comma 62 | 0.195 | 0.39 | 0.024 | 25 |
| Mycobacterium tuberculosis 607 | 0.39 | 0.78 | 0.39 | 6.25 |
| Streptococcus haemolyticus 68 | 0.78 | 3.12 | 0.097 | 12.5 |
| Streptococcus faecalis 5 | 1.56 | 6.12 | 0.39 | 12.5 |
| Diplococcus pneumoniae 1-19 | 0.024 | 0.195 | 0.048 | 1.56 |
| Corynebacterium diphtheriae 92 | 0.195 | 0.78 | 0.39 | 25 |

| Name of antibiotics: | 7a-hydroxyethyl—M.C. | 1a methyl 7a propyl—M.C. | 1a methyl 7a ethyl—M.C. | 7a-methyl—M.C. |
|---|---|---|---|---|
| X | $HO(CH_2)_2NH-$ | $nC_3H_7NH-$ | $C_2H_5NH-$ | $CH_3NH-$ |
| Y | $CH_3-$ | $CH_3-$ | $CH_3-$ | $CH_3-$ |
| Z | $H-$ | $CH_3-$ | $CH_3-$ | $H-$ |
| Staphylococcus aureus 209P | 0.39 | 0.195 | 0.048 | 0.048 |
| Sarcina eutea PcI 1001 | 0.195 | 0.195 | 0.195 | 0.39 |
| Bacillus subtilis ATCC 6633 | 0.78 | 0.195 | 0.195 | 0.048 |
| Salmonella typhi 379 | 25 | 50 | 0.25 | 3.12 |
| Shigella flexneri Za 3196 | 6.25 | 50 | 0.048 | 0.097 |
| Klebsiella pneumoniae 0/10 | 12.5 | 50 | 50 | 12.5 |
| Proteus X19 | 25 | 50 | 25 | 12.5 |
| Escherichia coli K-12 | 50 | 50 | 25 | 6.25 |
| Pseudomonas aeruginosa 35 | 12.5 | 50 | 25 | 25 |
| Vibrio comma 62 | 0.097 | 0.39 | 0.097 | 0.097 |
| Mycobacterium tuberculosis 607 | 0.195 | 0.78 | 0.39 | 1.56 |
| Streptococcus haemolyticus 68 | 12.5 | 0.78 | 0.097 | 0.195 |
| Streptococcus faecalis 5 | 1.56 | 0.195 | 0.195 | 0.39 |
| Diplococcus pneumoniae 1-19 | 0.097 | 0.195 | 0.024 | 0.012 |
| Corynebacterium diphtheriae 92 | 1.56 | 0.78 | 0.78 | 0.195 |

| Name of antibiotic: | 7a-ethyl—M.C. | 7a-isopropyl—M.C. | 7a-cyclohexyl—M.C. | 7-ethylenimino 9a-methoxy—Mitosane |
|---|---|---|---|---|
| X | $C_2H_5NH-$ | $(CH_3)_2CHNH-$ | ⟨phenyl⟩—NH— | $(CH_2)_2N-$ |
| Y | $CH_3-$ | $CH_3-$ | $CH_3-$ | $CH_3-$ |
| Z | H— | H— | H— | H— |
| Staphylococcus aureus 209P | 0.024 | 0.195 | 0.23 | 0.012 |
| Sarcina lutea PcI 1001 | 0.097 | 0.195 | 0.78 | 0.048 |
| Bacillus subtilis ATCC 6633 | 0.097 | 0.097 | 1.56 | 0.097 |
| Salmonella typhi 379 | 6.25 | 25 | 12.5 | 0.024 |
| Shigella flexneri Za 3196 | 0.024 | 12.5 | 12.5 | 0.048 |
| Klebsiella pneumoniae 0/10 | 25 | 12.5 | 25 | 0.195 |
| Proteus X19 | 50 | 50 | 50 | 0.39 |
| Escherichia coli K-12 | 12.5 | 50 | 50 | 0.195 |
| Pseudomonas aeruginosa 35 | 12.5 | 50 | 50 | 0.195 |
| Vibrio comma 62 | 0.048 | 0.195 | 0.195 | 0.024 |
| Mycobacterium tuberculosis 607 | 0.195 | 0.39 | 0.78 | 0.024 |
| Streptococcus haemolyticus 68 | 0.048 | 0.78 | 0.78 | 0.012 |
| Streptococcus faecalis 5 | 0.097 | 0.097 | 0.78 | 0.012 |
| Diplococcus pneumoniae 1-19 | 0.012 | 0.097 | 0.012 | 0.012 |
| Corynebacterium diphtheriae 92 | 0.39 | 0.78 | 0.195 | 0.195 |

| Name of antibiotics: | 7-piperidyl 9a-methoxy—Mitosane | 7-pyrrolidyl 9a-methoxy—Mitosane | 7-dimethylamino-9a-methoxy—Mitosane | 1a-methyl-9 amino-9a-hydroxy—Mitosane |
|---|---|---|---|---|
| X | $(CH_2)_5N-$ | $(CH_2)_4N-$ | $(CH_3)_2N-$ | $H_2N-$ |
| Y | $CH_3-$ | $CH_3-$ | $CH_3-$ | H— |
| Z | H— | H— | H— | $CH_3-$ |
| Staphylococcus aureus 209P | 0.195 | 0.39 | 0.195 | 3.12 |
| Sarcina lutea PcI 1001 | 0.097 | 0.78 | 0.097 | 15.5 |
| Bacillus subtilis ATCC 6633 | 0.39 | 0.78 | 0.39 | 1.56 |
| Salmonella typhi 379 | 6.25 | 6.25 | 3.12 | 25 |
| Shigella flexneri Za 3196 | 6.25 | 3.12 | 3.12 | 3.12 |
| Klebsiella pneumoniae 0/10 | 12.5 | 12.5 | 6.25 | 0.25 |
| Proteus X19 | 12.5 | 12.5 | 12.5 | 50 |
| Escherichia coli K-12 | 12.5 | 6.25 | 6.25 | 12.5 |
| Pseudomonas aeruginosa 35 | 25 | 12.5 | 12.5 | 50 |
| Vibrio comma 62 | 0.024 | 0.097 | 0.024 | 0.39 |
| Mycobacterium tuberculosis 607 | 0.097 | 0.39 | 0.079 | 0.39 |
| Streptococcus haemolyticus 68 | 0.39 | 0.39 | 0.78 | 6.25 |
| Streptococcus faecalis 5 | 0.78 | 1.56 | 0.78 | 0.39 |
| Diplococcus pneumoniae 1-19 | 0.024 | 0.048 | 0.024 | 0.78 |
| Corynebacterium diphtheriae 92 | 0.195 | 0.195 | 0.097 | 0.78 |

The invention being thus described, it will be obivous that the same may be varied in many ways. Such variations are not to be regarded as a departure from the spirit and scope of the invention, and all such modifications are intended to be included within the scope of the following claims.

What we claim is:
1. The compound of the formula:

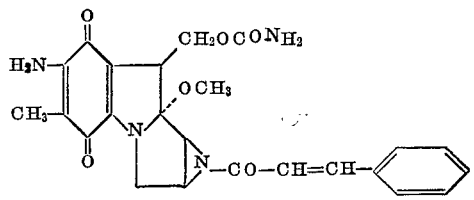

References Cited

UNITED STATES PATENTS 3,332,944    7/1967    Cosulich et al. _____ 260—247.2

OTHER REFERENCES

Conant, The Chemistry of Organic Compounds, frontispiece and page 373, The MacMillan Co., New York (1943).

JOHN D. RANDOLPH, Primary Examiner